US006344295B1

(12) United States Patent
Huot

(10) Patent No.: US 6,344,295 B1
(45) Date of Patent: *Feb. 5, 2002

(54) ZINC ALLOY POWDER FOR USE IN RECHARGEABLE CELLS

(75) Inventor: Jean Yves Huot, Québec (CA)

(73) Assignee: Noranda, Inc., Toronto (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,865

(22) Filed: Apr. 30, 1999

(51) Int. Cl.$^7$ ................................................. H01M 4/42
(52) U.S. Cl. ....................................... 429/229; 429/206
(58) Field of Search ................................. 429/229, 206

(56) References Cited

U.S. PATENT DOCUMENTS

| | | | |
|---|---|---|---|
| 4,037,033 A | | 7/1977 | Takamura et al. |
| 4,552,821 A | | 11/1985 | Gibbard et al. |
| 4,592,974 A | | 6/1986 | Takeda et al. |
| 4,658,498 A | | 4/1987 | Yamaura et al. |
| 4,861,688 A | * | 8/1989 | Miura et al. |
| 4,929,520 A | | 5/1990 | Kordesch et al. |
| 4,957,826 A | | 9/1990 | Cheiky |
| 5,139,900 A | | 8/1992 | Tada et al. |
| 5,162,170 A | * | 11/1992 | Miyabashi et al. |
| 5,168,018 A | | 12/1992 | Yoshizawa et al. |
| 5,240,793 A | | 8/1993 | Glaeser |
| 5,300,371 A | | 4/1994 | Tomantschger et al. |
| 5,308,374 A | | 5/1994 | Yoshizawa et al. |
| 5,384,214 A | | 1/1995 | Sugihara et al. |
| 5,419,987 A | | 5/1995 | Goldstein et al. |
| 5,424,145 A | | 6/1995 | Tomantschger et al. |
| 5,425,798 A | | 6/1995 | Sasaki et al. |
| 5,541,021 A | * | 7/1996 | Watanabe et al. |
| 5,595,836 A | | 1/1997 | Tano et al. |
| 5,626,988 A | | 5/1997 | Daniel-Ivad et al. |
| 5,639,578 A | | 6/1997 | Urry |
| 5,665,491 A | * | 9/1997 | Tomiyama et al. |
| 5,677,083 A | * | 10/1997 | Tomiyama |
| 5,721,068 A | | 2/1998 | West et al. |
| 5,721,072 A | | 2/1998 | Mototani et al. |
| 5,773,176 A | | 6/1998 | Serenyi |

OTHER PUBLICATIONS

Kazuhide Miyazaki, et al., Fundamental Studies on Hydrogen Gas Evolution in Terms of Particle Shape of Zinc Anodes, 2nd Battery Material Symposium, Graz, 1985 (The 3rd MnO$_2$ Symposium), at 359–374.

Frank R. McLarnon and Elton J. Cairns, The Secondary Alkaline Zinc Electrode, J. Electrochem. Soc., vol. 138, No. 2 (Feb., 1991) at 645–664.

Albert Himy, Silver–Zinc Battery: Best Practices, Facts and Reflections, Vantage Press, New York, 1995, at 6–9; and.

Josef Daniel–Ivad and Jean–Yves Huot, Mercury– And Lead–Free Rechargeable Zn/MnO$_2$ Cells, Proceedings of the Symposium on Rechargeable Zinc Batteries, Electrochemical Society 1996, PV95–14, at 109–120.

* cited by examiner

Primary Examiner—Tom Dunn
Assistant Examiner—Colleen Cooke
(74) Attorney, Agent, or Firm—Holland & Bonzagni, P.C.; Mary R. Bonzagni, Esq.

(57) ABSTRACT

Rechargeable cells employing mercury- and lead-free zinc-bismuth alloys as negative active materials are provided. Such cells demonstrate low after-cycle gassing, improved cumulative discharge capacities and initial discharge performances comparable to that of rechargeable cells that employ leaded zinc powders as negative anode materials.

15 Claims, 2 Drawing Sheets

ZINC ALLOY POWDER FOR USE IN RECHARGEABLE CELLS

FIELD OF THE INVENTION

The present invention generally relates to rechargeable cells that demonstrate, among other things, good cycle-life, low after-cycle gassing and improved cumulative discharge capacity and, more particularly, relates to rechargeable cells that employ a mercury- and lead-free zinc-bismuth alloy as the negative active material.

BACKGROUND OF THE INVENTION

Batteries are used to power a wide variety of products and basically constitute electrochemical systems or devices which are capable of converting electrochemical energy into direct current. Examples of such electrochemical systems include AgO/Zn, $Ag_2O$/Zn, HgO/Zn, HgO/Cd, $Mn_2O$/Zn, Ni/Zn, Ni/Cd, Ni/MH and Zn/air.

Batteries are made up of one or more battery cells. Each battery cell basically comprises a cathode electrode, an anode electrode, a battery separator and a quantity of an electrolytic solution. Upon application of an electrical potential or load across the cell, electrons are generated through oxidation at the anode. The generated electrons pass through the load and then return to the cell at the cathode, where the cathode is reduced.

Batteries are either primary or secondary. Primary batteries produce energy by consuming one of the chemicals employed in the one or more cells that make up the primary battery. When the chemical is gone, the primary battery no longer produces energy and must be replaced. Secondary or rechargeable batteries obtain energy by transforming certain kinds of chemicals. When the transformation or change is complete, the battery no longer produces energy. It can be renewed or recharged, however, by sending current from another source through the battery to restore the chemicals to their original state.

The performance requirements or expectations of primary and secondary batteries are fundamentally distinct. Primary batteries are expected to exhibit low self discharge rates and to satisfy demanding performance requirements. Secondary batteries, on the other hand, are expected to demonstrate good cycle life and cumulative performance. As will be readily appreciated by those skilled in the art, rules and parameters that govern self-discharge rates and performance of primary batteries differ from those that govern cycle life and cumulative performance of secondary batteries. It would, therefore, not be feasible to attempt to predict the effect of a change in, for example, the electrode make-up, on the performance of a secondary battery from the effect of such a change on the performance of a primary battery.

Primary and rechargeable manganese dioxide-based alkaline cells are well known and include a cathode or positive electrode having manganese dioxide ($MnO_2$) as an active material, an anode or negative electrode utilizing zinc as an active material, an aqueous solution of potassium hydroxide as electrolyte, and a separator between the positive and the negative electrodes.

The zinc electrodes that are employed in rechargeable or secondary alkaline zinc batteries and cells, such as rechargeable alkaline manganese (RAM) cells, are made from metallic zinc (Zn) or zinc oxide (ZnO). Metallic zinc is typically used when charged positive electrodes are readily available, such as $MnO_2$ and air electrodes. Such electrodes can be charged electrically or refueled (e.g., pumped out, electrically recharged and pumped in). Otherwise, the negative electrode in rechargeable zinc cells is typically a porous, polymer-bonded Zn—ZnO sheet, that has to be electroformed. In the latter systems, additives (e.g., mercury, cadmium, lead, indium, bismuth and the like) can be employed in the form of oxide or hydroxide compounds in amounts ranging from 1 to 5 wt. % to control hydrogen gassing, shape change and dendrite growth of the secondary zinc electrode. For environmental reasons, however, the use of mercury, cadmium and lead is minimized or avoided.

Secondary alkaline zinc batteries and cells including RAM cells consistently demonstrate poor cycle-life reportedly due to zinc redistribution and the high solubility of the zinc electrode discharge product in strong alkaline electrolytes. These factors reportedly contribute to or cause observed shape changes, gassing and formation of dendrites. As a result, it has been very difficult to produce sealed rechargeable cells with zinc electrodes without providing a resealable venting mechanism that would release excessive gassing developed during cycling and storage.

Effects of alternative alloying elements on RAM performance were discussed in *Symposium on Rechargeable Zinc Batteries*, Electrochemical Society 1996, PV95-14, p120. This article discloses that lead-free indium-zinc (In—Zn) alloy powder could be used in mercury-free RAM cells. This article does not, however, disclose or discuss material utilization and/or cumulative capacity of RAM cells utilizing bismuth-zinc powders.

Several patents teach the use of zinc alloy powders as the negative active material in primary alkaline manganese (PAM) cells. As alluded to above, however, primary and secondary batteries and cells represent separate and distinct arts due to the fundamentally distinct performance requirements assigned to these devices.

For example, U.S. Pat. No. 5,721,068 describes a cell that comprises zinc or a zinc alloy containing zinc and bismuth in the anode for primary batteries. Although reference to rechargeable zinc batteries is made in this reference, no information on cycle-life is provided.

In view of the above, it is a general object of the present invention to provide a rechargeable cell or battery that serves to address the above-mentioned problems or deficiencies attributed to prior art rechargeable cells or batteries.

It is a more specific object to provide a sealed, rechargeable cell or battery that can operate without a resealable venting mechanism.

It is an even more specific object to provide a RAM cell that demonstrates good cycle life, low after-cycle gassing and improved cumulative discharge capacity.

It is an even more specific object to provide a RAM cell that demonstrates improved high drain performance.

It is another object to provide an anode for use in rechargeable cells that employs a zinc alloy as the negative active material.

It is yet a further object to provide a zinc alloy material for use as a negative active material in rechargeable cells.

SUMMARY OF THE INVENTION

The present invention therefore principally relates to a zinc alloy powder for use in rechargeable cells, which comprises from about 50 to about 170 ppm bismuth and, optionally, from about 0.003 to about 0.2% by weight (wt.) indium.

The present invention also relates to a zinc-bismuth alloy powder as defined hereinabove that contains 0.1% by wt. or more of particles having an average particle size ranging from about 20 to about 45 microns ($\mu$)

The present invention further relates to an anode that employs the above-referenced zinc alloy powder as the negative active material.

The present invention also relates to a rechargeable cell that basically comprises a positive electrode, an anode utilizing the zinc alloy material as defined hereinabove, a separator and an alkaline electrolyte, all in a suitable container.

The foregoing and other features and advantages of the present invention will become more apparent from the following description.

DETAILED DESCRIPTION OF THE PREFERRED EMBODIMENT

The rechargeable cells of the present invention demonstrate low after-cycle gassing, improved cumulative discharge capacity and initial discharge performance comparable to that of rechargeable cells that employ leaded zinc powders as the negative active material. Due to the low after-cycle gassing demonstrated by these cells, sealed, rechargeable cells can advantageously operate without a resealable venting mechanism.

In the cells of the present invention, the negative active material is a zinc alloy containing bismuth and, optionally, indium. Zinc is preferably a low gassing metallic zinc having a purity of 99.995% and is in powder form. Such powders are commercially available, and generally have an average particle size of between 45 and 600 microns ($\mu$).

The zinc alloy of the present invention is "lead-free" and "mercury-free", in that it contains no lead or mercury outside the limitations set by conventional processing methods and the extremely small natural content of the zinc alloy materials. It may contain minor, residual amounts of lead and/or mercury which do not affect its properties.

Bismuth, preferably having a purity of 99.99% is present at a concentration ranging from about 50 to about 170 ppm, based upon the total amount of zinc present in the alloy, and more preferably is present at a concentration ranging from about 50 to about 160 ppm.

It has been found by way of the present invention that when bismuth is present in the alloy within the above-referenced ranges it is very effective in reducing and maintaining initial gassing and improving initial electrical performance of RAM cells. When bismuth is present at concentrations below 50 ppm, however, sufficient impact on initial gassing and/or electrical performance is not realized while bismuth concentrations above 170 ppm serves to effect a drastic reduction in cycle life and after-cycling gassing performance.

Figure 1:
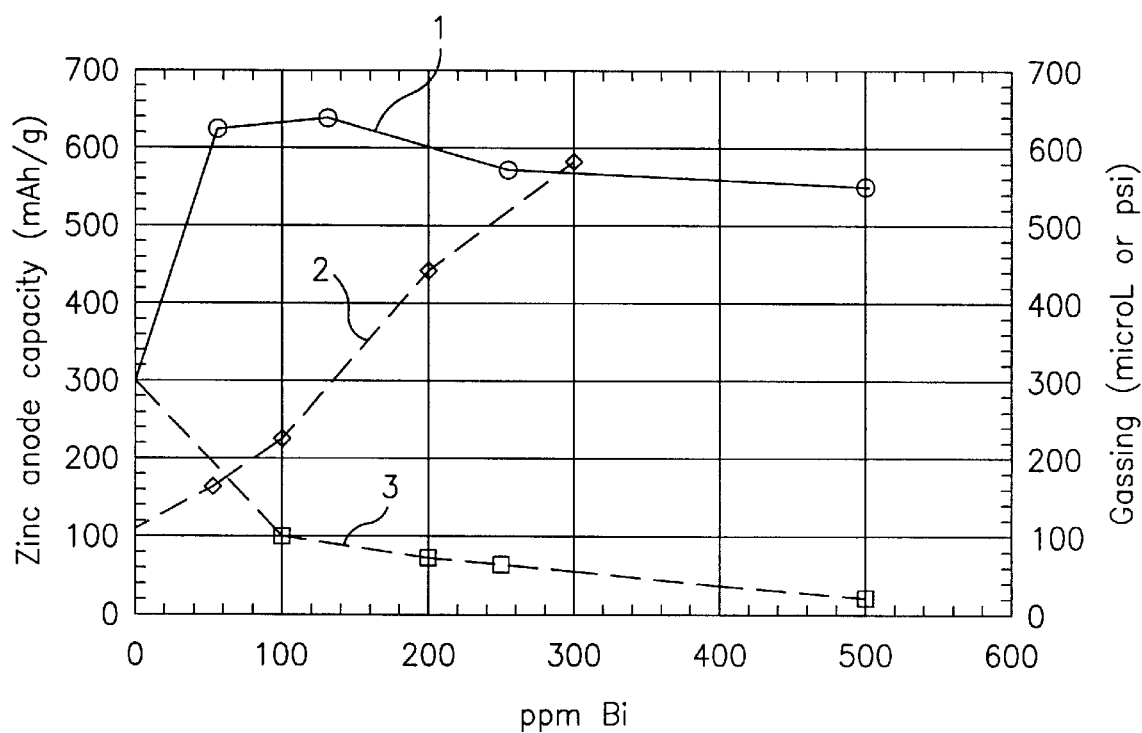
FIG. 1 is a graph which plots out-of-cell gelled powder electrical capacity (mAh/g) and gassing (microL) and RAM cell pressure (psi) after 25 cycles versus bismuth content of zinc powder.

FIG. 1, which is meant to be exemplary, not limiting, compares the out-of-cell electrical capacity (mAh/g), gassing (microL) and RAM cell pressure (psi) after 25 cycles of cells employing negative active materials employing various concentrations of bismuth. In FIG. 1, line 1 refers to out-of-cell electrical capacity, while line 2 refers to after-cycling cell gassing. Line 3, in FIG. 1, refers to gelled powder gassing. It can be noted from this graph that the bismuth range in lead-free zinc powder for RAM cells is very narrow. The upper limit being determined by the effect of bismuth on after-cycling cell gassing and the acceptable gassing range in sealed rechargeable cells (i.e., $\leq$350 psi).

Indium may also be employed in the zinc alloy material of the present invention. It is preferred to employ indium at concentrations ranging from about 0.003 to about 0.2% by wt., based upon the total weight of the zinc alloy material. It is more preferred to employ indium at concentrations ranging from about 0.003 to about 0.1% by wt.

Other alloying elements, such as, aluminum, calcium and magnesium, may be added to the alloy material of the present invention provided such elements do not adversely impact upon the after-cycle gassing of the host cell.

In a preferred embodiment, the zinc alloy powder of the present invention comprises from about 50 to about 160 ppm bismuth.

In another preferred embodiment, the inventive zinc alloy powder comprises from about 50 to about 160 ppm bismuth and from about 0.003 to about 0.1% by wt. indium.

In a more preferred embodiment, an optimum balance of fines and coarses has been identified and employed for the purpose of achieving improved cell performance. The inventor, by way of the present invention, has made the surprising discovery that increasing the so-called fine fraction (i.e., particles measuring <325 mesh (<45$\mu$) in the negative active material of the present invention will not serve to increase the initial and after-cycle gassing of the host cell. In fact, it has now been discovered that increasing the fine fraction can result in lower gassing and improved high drain performance.

It has long been held by those skilled in the art that the amount of zinc particles smaller than 325 mesh (45$\mu$) in zinc powders should be minimized to achieve an acceptable gassing performance of alkaline cells. In fact, even the fraction between mesh 200 and 325 (45–75$\mu$) was targeted as problematic and therefore minimized. See generally K. Miyazaki, H. Nishihama, and N. Kasahara, 2nd Battery Material Symposium, Graz, 1985, pp 359–374.

In accordance with the above-referenced discovery and in a preferred embodiment, the zinc alloy powder of the present invention contains 0. 1% by wt. or more (more preferably from about 0.1 to about 6% by wt.) of particles having an average particle size of 20 to 45 microns ($\mu$). In particular, the particle size distribution (PSD) of the zinc alloy powder of the present invention, which follows a log-normal distribution, displays a mean diameter (i.e., average particle size) of from about 100 to about 200 microns ($\mu$) and a width distribution ranging from about 1.3 to about 2.2, more preferably from about 1.4 to about 1.8 and, most preferably, from about 1.5 to about 1.7, so that the PSD is shifted toward the fine fractions.

Figure 2:
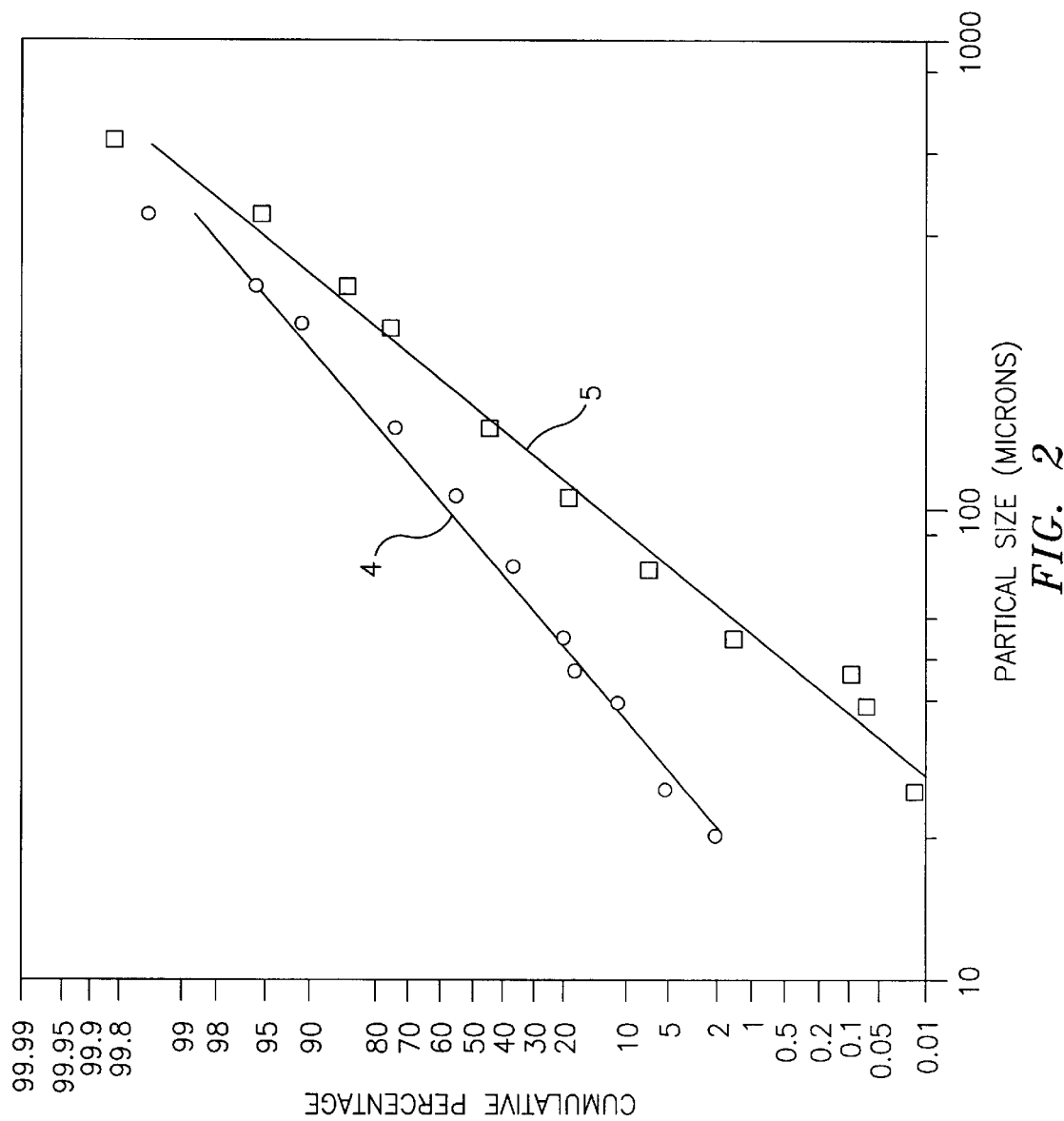
FIG. 2 is a graph which plots typical log-normal particle size distributions of lead-zinc powder and log-normal particle size distributions of the zinc alloy powder of the present invention.

Referring now to FIG. 2, which is meant to be exemplary, not limiting, the log-normal particle size distributions of lead-zinc powder is compared to that of the zinc alloy of the present invention. In FIG. 2, line 4 refers to the log-normal particle size distribution of the inventive zinc alloy material, while line 5 refers to the typical log-normal particle size distribution of lead-zinc powder. As will be noted from this graph, the PSD of the zinc alloy material of the present invention complies with log-normal distribution law.

As will be readily appreciated by those skilled in the art, the PSD of zinc alloy powders can be adjusted by gas atomization and screening. A majority of atomized powders are polydisperse and comply with log-normal distribution laws, as evidenced by a straight line on a log probability graph. PSD is usually described in terms of mean diameter or average particle size and width (standard deviation). It is noted, however, that in some extreme cases, the PSD is not a straight line and abnormal log-normal distributions are observed. As those skilled in the art will quickly recognize, log-normal PSD is dependent upon the performance of the atomizer and classification devices utilized in adjusting PSD in that dust separation, severe screening and bimodal distribution have been known to lead to abnormal distributions.

For purposes of the present invention, the term classification refers to particle classification, such as air classification or screeners.

Current devices allow for width distributions ranging from about 1.3 to about 2.3, depending on atomizer design and particle classification set-up.

Anodes utilizing the zinc alloy material of the present invention may be prepared in accordance with the methods described in U.S. Pat. No. 5,626,988, which is incorporated herein by reference.

The rechargeable cells of the present invention basically comprise a positive electrode, an anode utilizing the zinc alloy material of the present invention, a separator and an alkaline electrolyte, all in a suitable container. Such cells may be prepared in accordance with the methods described in U.S. Pat. No. 5,300,371, which is also incorporated herein by reference.

The present invention is described in more detail in reference to the following Examples which are for purposes of illustration only and are not to be understood as indicating or implying any limitations on the broad invention described herein. In particular, although the zinc alloy of the present invention will be described in reference to rechargeable alkaline manganese (RAM) cells, it is not limited thereto. The inventive zinc alloy material can be utilized as the negative active material in any rechargeable zinc alkaline cell or battery where low after-cycle gassing and improved cumulative discharge capacity are desired.

Working Examples

In the working examples set forth below, the following components were used:

Zinc-zinc metal in the form of ingots, having a purity of 99.995% by wt. and obtained from Noranda Inc., 1 Adelaide Street East, Toronto, Ontario, CANADA under the product designation SHG.

Lead-lead wire obtained from Fonderie Générale du Canada, 1400 rue Norman, Lachine, Quebec, CANADA.

Bismuth-bismuth granules having a purity of 99.99% by wt. obtained from Indium Corporation of America, 1676 Lincoln Avenue, Utica, N.Y. 13502-5312.

Indium-indium granules having a purity of 99.99% by wt. obtained from Indium Corporation of America.

EXAMPLES C1 AND 1 TO 7

Sample Preparation

1. Zinc and Zinc Alloy Powder Preparation

A quantity of zinc was alloyed with various amounts of bismuth by heating the zinc ingots until molten (i.e., approximately 575° C.) and by adding predetermined amounts of its bismuth to the molten zinc metal. The resulting alloy was then air atomized by a low-pressure nozzle and thereafter screened into zinc alloy powder having a predetermined particle size range. A leaded control powder was also prepared in accordance with the above-referenced process.

The log-normal particle size distribution (PSD) of the resulting zinc or zinc alloy powder and the leaded control powder was then determined by separating the particles into defined ranges of average particle sizes by screening or sieving the powder. The particles in each defined range were then weighed and a plot of the log of the cumulative weight of particles in each defined range prepared. Linear correlation was computed and the linear curve was expressed in terms of an average or mean diameter (D50) and slope (W). As noted in Table 1 hereinbelow, the produced powders had a log-normal PSD with a mean particle size D50 around 170$\mu$ and width in the range of 1.5 to 1.7, resulting in fine fraction (−200 mesh) particles ranging from 45 to 75$\mu$. All powders contained <0.5% of −325 mesh (<45$\mu$) particles.

2. Anode Preparation

Anodes employing one of the above-referenced leaded control, zinc or zinc alloy powders were prepared in accordance with the process described in U.S. Pat. No. 5,626,988 at Col. 9, Ins. 61 et seq. The method involved treating the powder with an organic surfactant or wetting agent and then coating the treated powder with a film of an aqueous solution of indium sulphate.

3. Test Cell Preparation

Alkaline AA-size test cells employing one of the above-referenced anodes were prepared in accordance with the process described in U.S. Pat. No. 5,424,145 at Col. 8, Ins. 10 et seq. with a theoretical discharge capacity of the zinc electrode at about 100% of the theoretical one electron capacity of the manganese dioxide electrode. It is noted that for the working examples described herein, the composition of the zinc powder constituted the only variable. All other components in the cells were held constant in such a way that the volume of the total cell materials was maintained at a constant level.

The prepared test cells were then tested for discharge performance and gassing in accordance with the following test methods.

Test Methods

1. Cycle Performance Testing

Each test cell was subjected to discharge tests to evaluate their discharge performance. In particular, each test cell was subjected to over twenty-five repeated charging and discharging cycles with each cycle consisting of discharging the test cell on a 3.9Ω load resistor down to an end voltage of 0.9 volts followed by a 12 hour charge to a cell voltage of 1.65 volts by applying an initial charge current of 400 mA, which tapered off as the cell voltage increased towards the charge voltage limit of 1.65 volts. The discharge capacity of each test cell from the first discharge/charge cycle was determined by measuring the actual current flow via a 0.1 ohm shunt resistor and integration of the current values over discharge time. The cumulative discharge capacity for each test cell was determined by adding the cell's delivered discharge capacity over the twenty-five discharge/charge cycles. Results are reported in ampere-hour (Ah) capacity to the specified end voltage and represent an average of all cells tested.

2. Gassing Tests

The internal cell pressures of each test cell undergoing cycle performance testing was monitored by measuring the gas volume released from the test cell by means of puncturing and collection of the accumulated gas with a volumetric displacement method. After completion of the cycle performance testing the extent of cell gassing was estimated by recording the accumulated gas in milliliters, calculating the internal gas pressures based on the measured gas volume and known, constant internal cell void volume for each test cell. Average and maximum cell pressures were recorded for all cells tested.

Results are reported in psi with minimum discharge performance being identified as 350 psi, which represents the maximum gas pressure that can be tolerated in alkaline AA-size cells and is set at 50% of the minimum vent pressure of the sealing gasket.

The results obtained from the cycle performance testing and from the gassing tests on the prepared test cells are set forth in Table 1 hereinbelow.

TABLE I

Summary of Examples C1 and 1 to 7

| | ZINC ALLOY COMPOSITION[1] (ppm) | | LOG - NORMAL PSD | | | EXTREME FRACTIONS | | RELATIVE CAPACITY 3.9 Ω to 0.9 V | | GASSING (psi) |
|---|---|---|---|---|---|---|---|---|---|---|
| Example | LEAD | BISMUTH | D50 (μ) | WIDTH | R² (%) | +30 MESH | −200 MESH | CYCLE 1 | CUMULATIVE 25 CYCLES | MAX |
| C1 | 500 | 0 | 161 | 1.58 | 97.5 | 0% | 6.7% | 0% | 0% | 268 |
| 1 | 0 | 0 | 165 | 1.57 | 99.0 | 0% | 6% | −14% | −2% | 150 |
| 2 | 0 | 50 | 171 | 1.65 | 98.3 | 0% | 9.2% | 3% | 6% | 158 |
| 3 | 0 | 100 | 162 | 1.67 | 98.8 | 0% | 10.2% | −2% | 5% | 228 |
| 4 | 0 | 120 | 176 | 1.60 | 98.8 | 0.05% | 4.3% | −1% | 1% | 275 |
| 5 | 0 | 160 | 176 | 1.60 | 98.9 | 0.03% | 4.6% | 2% | 18% | 189 |
| 6 | 0 | 180 | 176 | 1.60 | 98.6 | 0.01% | 5.0% | −3% | 4% | 445 |
| 7 | 0 | 290 | 170 | 1.59 | 98.5 | 0.01% | 5.1% | 0% | 13% | 583 |

[1]expressed in terms of added alloying element in ppm.

In Examples C1 and 1 to 7, the effect of various anode Zn—Bi alloy compositions (having <0.5% by wt. of very fine fraction particles (i.e., <45μ)) on a host test cell's discharge performance and after-cycle gassing was evaluated. Example C1 constitutes the control and all results noted in Table 1 are relative to this control. As shown in Table 1, Examples 2 to 5, which employed Zn—Bi alloy compositions having from 50 to 160 ppm Bi, demonstrated satisfactory initial discharge capacity and improved cumulative discharge capacity over 25 cycles. In addition, Examples 2 to 5 demonstrated acceptable after-cycle gassing. In contrast, Example 1, which employed pure zinc powder, demonstrated a low initial discharge capacity while Examples 6 and 7, which employed Zn—Bi alloy compositions having 180 and 290 ppm Bi, demonstrated unacceptable gassing levels. As noted hereinabove, 350 psi represents the maximum gas pressure that can be tolerated in alkaline AA-size RAM cells.

EXAMPLES C2 AND 8 AND 9

In Examples C2 and 8 and 9, the effect of the presence of indium in Zn—Bi alloy compositions (having <0.5% by wt. of very fine fraction particles (i.e., <45μ) on a cell's discharge performance and after-cycle gassing was evaluated. The Zn—Pb, Zn—Bi and Zn—Bi—In alloy powders, anodes and test cells were prepared in accordance with the above-referenced processes. It is noted that the total amount of indium in the prepared anodes was held constant by reducing the quantity of indium applied (in the form of a film) onto the zinc alloy powder of each anode during anode preparation by an amount equal to the amount alloyed in the zinc alloy powder of Example 9.

The prepared test cells were then tested for discharge performance and gassing in accordance with the test methods noted above with the results tabulated in Table 2 hereinbelow.

TABLE 2

Summary of Examples C2 and 8 to 9

| | ZINC ALLOY COMPOSITION[1] (ppm) | | | LOG - NORMAL PSD | | | EXTREME FRACTIONS | | RELATIVE CAPACITY 3.9 Ω to 0.9 V | | GASSING (psi) | |
|---|---|---|---|---|---|---|---|---|---|---|---|---|
| Example | LEAD | BISMUTH | INDIUM | D50 (μ) | WIDTH | R² (%) | +30 MESH | +200 MESH | CYCLE 1 | CUMULATIVE 25 CYCLES | AVG. | MAX |
| C2 | 500 | 0 | 0 | 161 | 1.58 | 97.5 | 0% | 6.7% | 0% | 0% | 87 | 268 |
| 8 | 0 | 92 | 0 | 131 | 1.54 | 99.4 | 0% | 10.1% | −2% | 5% | 80 | 230 |
| 9 | 0 | 94 | 261 | 128 | 1.50 | 98.3 | 0% | 10.5% | 0% | −5% | 56 | 162 |

[1]expressed in terms of added alloying element in ppm.

Examples 8 and 9 serve to demonstrate that the presence of indium in the Zn-Bi alloy compositions of the present invention does not serve to impact upon the host cell's discharge performance but does appear to lower gassing.

EXAMPLES C3 AND 10 TO 12

In Examples C3 and 10 to 12, the effect of particle size and, in particular, the effect of very fine (i. e., <45μ) zinc alloy powder on gassing was evaluated. For this evaluation, a 500 ppm Bi-containing alloy was prepared in accordance with the above-referenced process, however, the resulting alloy was atomized and screened so as to obtain: (1) a very fine powder having the following PSD: +200 mesh (>75 μ)=0.9%; −200+325 mesh (45–75μ)=9.9%; 325+635 mesh (20–44μ)=61.9%; and −635 mesh (<20μ)=27.6%; and (2) a regular or control powder having the following PSD: +60 mesh=21%; +100 mesh=34%; +200 mesh=38%; +325 mesh=6.7%; +635 mesh=<0.5%; and −635 mesh=0%.

The mean diameter and width measured for the very fine powder was 25μ and 1.5, respectively. In preparing anodes for this evaluation, the very fine powder was added to the regular or control powder at levels of 5% by wt. (Example 10), 10% by wt. (Example 11) and 20% by wt. (Example 12). The very fine powder was substituted for the regular or control powder so as to maintain the total weight of zinc alloy powder within each anode constant. The resulting Bi-content based on total Zn weight in the prepared anodes were 26 ppm (Example 10), 53 ppm (Example 11) and 105 ppm (Example 12).

Test cells employing the prepared anodes were constructed and then tested for gassing in accordance with the above-referenced process and test method. The results are tabulated in Table 3 hereinbelow.

The prepared test cells were then tested for gassing in accordance with the procedure identified above. The test cells were also subjected to slightly heightened cycle performance testing at discharge loads of 2.2Ω and 1Ω as described below:

Each test cell was performance tested by continuously discharging the cell on the specified load resistor to an end of discharge (cutoff) voltage of 0.8 volts, followed by a 12 hour recharge to 1.65 volts over 10 cycles. For the 2.2Ω test, the typical average first cycle performance for C5 was determined to be 1.20 amphere-hour (Ah), while the cumulative discharge capacity (>10 cycles) was determined to be 7.3 Ah. For the 1.0Ω test, the typical average first cycle performance for C5 was 0.70 Ah, while the cumulative

TABLE 3

Summary of Examples C3 and 10 to 12

| Example | ZINC ALLOY COMPOSITION[1] (PPM) BISMUTH | PSD +60 mesh | +100 mesh | +200 mesh | +325 mesh | +635 mesh | −635 mesh | GASSING (psi) AVG. | MAX |
|---|---|---|---|---|---|---|---|---|---|
| C3 | 500 | 21% | 34% | 38% | 16.7% | <0.5% | 0% | 58 | 112 |
| 10 | 26 | 20% | 32% | 36% | 7% | 3% | 1% | 47 | 84 |
| 11 | 53 | 19% | 31% | 34% | 7% | 6% | 3% | 46 | 96 |
| 12 | 105 | 17% | 27% | 31% | 7% | 12% | 6% | 48 | 88 |

[1]expressed in terms of added alloying element in ppm.

Examples 10 to 12 surprisingly and unexpectedly demonstrate that an increase in the very fine fraction of Zn—Bi alloy powders does not adversely impact upon gassing levels but rather serves to effect an advantageous reduction in observed gassing levels.

EXAMPLES C5, 8a, 9a, 13 AND 14

In Examples C5, 8a, 9a, 13 and 14, the effect of various Zn—Bi—(In) alloy compositions (having an increased (i.e., 0.1 to 6% by wt.) very fine fraction) on a host test cell's gassing and discharge performance was evaluated. The alloy composition, anodes and test cells were prepared in accordance with the above-referenced techniques. The total amount of indium in the prepared anodes was held constant by reducing the quantity of indium applied (in the form of a film) onto the zinc alloy powder of each anode during anode preparation by an amount equal to the amount alloyed in the zinc alloy powder of Examples 9a and 14.

A summary of the properties of the prepared Zn—Bi—(In) alloy powders is provided by way of Table 4A hereinbelow.

discharge capacity (>10 cycles) was 4.0 Ah. The term cumulative discharge capacity, as used herein, is defined as the total delivered discharge capacity over the 10 discharge/charge cycles by addition of the individual capacities from such cycles.

The gassing and discharge performance results are shown in Table 4B below.

TABLE 4B

Summary of Examples C5, 8a, 9a, 13 and 14

| | | | Relative High Rate Performance | | | |
|---|---|---|---|---|---|---|
| | | | 2.2 Ω to 0.8 V | | 1.0 Ω to 0.8 V | |
| Example | Gassing (psi) AVG. | MAX | Cycle 1 | Cumulative 10 Cycles | Cycle 1 | Cumulative 10 Cycles |
| C5 | 87 | 268 | 0% | 0% | 0% | 0% |
| 8a | 80 | 230 | −10% | −12% | −26% | −2% |

TABLE 4A

Summary of Properties of Fine Zn—Bi—(IN) Alloys of Examples C5, 8a, 9a, 13 and 14

| Example | Zn—Bi—(In) Alloy Composition[1] (ppm) Lead | Bismuth | Indium | Log - Normal PSD D50 (μ) | Width | R² (%) | PSD +60 mesh | +100 mesh | +200 mesh | +325 mesh | +635 mesh | −635 mesh |
|---|---|---|---|---|---|---|---|---|---|---|---|---|
| C5 | 500 | 0 | 0 | 161 | 1.58 | 97.5 | 21% | 34% | 38% | 6.7% | 10.5% | 0% |
| 8a | 0 | 92 | 0 | 131 | 1.54 | 99.4 | 9% | 29% | 51% | 10% | 0.3% | 0% |
| 9a | 0 | 94 | 261 | 128 | 1.50 | 98.3 | 8% | 28% | 53% | 10% | 0.1% | 0% |
| 13 | 0 | 92 | 0 | 120 | 1.60 | 98.8 | 8% | 26% | 47% | 13% | 5% | 0.2% |
| 14 | 0 | 94 | 261 | 117 | 1.59 | 98.7 | 8% | 25% | 47% | 14% | 6% | 0.5% |

[1]expressed in terms of added alloying element in ppm.

TABLE 4B-continued

Summary of Examples C5, 8a, 9a, 13 and 14

| Ex-ample | Gassing (psi) | | Relative High Rate Performance | | | |
|---|---|---|---|---|---|---|
| | | | 2.2 Ω to 0.8 V | | 1.0 Ω to 0.8 V | |
| | AVG. | MAX | Cycle 1 | Cumulative 10 Cycles | Cycle 1 | Cumulative 10 Cycles |
| 9a | 56 | 162 | −11% | −8% | −20% | −2% |
| 13 | 63 | 197 | 0% | 5% | 0% | 5% |
| 14 | 44 | 130 | 0% | 5% | 0% | 5% |

Examples 8a, 9a, 13 and 14 demonstrate that the test cells employing the present inventive alloy compositions without the very fine fraction show acceptable gassing and cumulative discharge capacity but lower first cycle performance while test cells with increased very fine fraction evidence a reduction in observed gassing levels while demonstrating comparable first cycle discharge performance and improved or increased cumulative discharge capacity when compared to leaded control C5.

Although this invention has been shown and described with respect to specific embodiments thereof, it will be understood by those skilled in the art that various changes may be made without departing from the spirit and scope of the claimed invention.

Having thus described the invention, what is claimed is:

1. A zinc alloy powder for use in rechargeable cells which comprises from about 50 to about 170 ppm bismuth and from 0 to about 0.2% by weight indium, wherein said zinc alloy powder contains ≧0.1% by weight of particles having an average particle size ranging from about 20 to about 45 microns.

2. The zinc alloy powder of claim 1, wherein said zinc alloy powder comprises from about 50 to about 160 ppm bismuth.

3. The zinc alloy powder of claim 1, wherein said zinc alloy powder comprises from about 50 to about 160 ppm bismuth and from about 0.003 to about 0.1% by weight indium.

4. The zinc alloy powder of claim 1, wherein said zinc alloy powder contains from about 0.1 to about 6% by weight of particles having an average particle size ranging from about 20 to about 45 microns.

5. A zinc alloy powder for use in rechargeable cells which comprises from about 50 to about 160 ppm bismuth and, optionally, from about 0.003 to about 0.1% by weight indium, wherein said zinc alloy powder contains from about 0.1 to about 6% by weight of particles having an average particle size ranging from about 20 to about 45 microns.

6. A zinc alloy powder for use in rechargeable alkaline manganese cells which consists of from about 50 to about 170 ppm bismuth and from 0 to about 0.2% by weight indium, wherein said zinc alloy powder contains ≧0.1% by weight of particles having an average particle size ranging from about 20 to about 45 microns.

7. An anode adapted for use in a rechargeable cell which comprises a zinc alloy powder consisting of from about 50 to about 170 ppm bismuth and from 0 to about 0.2% by weight indium.

8. The anode of claim 7, wherein said zinc alloy powder comprises from about 50 to about 160 ppm bismuth.

9. The anode of claim 7, wherein said zinc alloy powder comprises from about 50 to about 160 ppm bismuth and from about 0.003 to about 0.1% by weight indium.

10. The anode of claim 7, wherein said zinc alloy powder contains ≧0.1% by weight of particles having an average particle size ranging from about 20 to about 45 microns.

11. The anode of claim 10, wherein said zinc alloy powder contains from about 0.1 to about 6% by weight of particles having an average particle size ranging from about 20 to about 45 microns.

12. An anode adapted for use in a rechargeable cell which comprises a zinc alloy powder comprising from about 50 to about 160 ppm bismuth and, optionally, from about 0.003 to about 0.1% by weight indium, wherein said zinc alloy powder contains from about 0.1 to about 6% by weight of particles having an average particle size ranging from about 20 to about 45 microns.

13. An anode adapted for use in a rechargeable cell which consists of a zinc alloy powder that is coated with both an organic surfactant and with indium and that consists of from about 50 to about 170 ppm bismuth and from 0 to about 0.2% by weight indium.

14. An anode adapted for use in a rechargeable cell which comprises a zinc alloy powder comprising from about 50 to about 170 ppm bismuth and from 0 to about 0.2% by weight indium, wherein said zinc alloy powder contains ≧0.1% by weight of particles having an average particle size ranging from about 20 to about 45 microns.

15. An anode adapted for use in a rechargeable alkaline manganese cell which comprises a zinc alloy powder consisting of from about 50 to about 170 ppm bismuth and from 0 to about 0.2% by weight indium, wherein said zinc alloy powder contains ≧0.1% by weight of particles having an average particle size ranging from about 20 to about 45 microns.

\* \* \* \* \*

UNITED STATES PATENT AND TRADEMARK OFFICE
CERTIFICATE OF CORRECTION

| | | |
|---|---|---|
| PATENT NO. | : 6,344,295 B1 | Page 1 of 1 |
| DATED | : February 5, 2002 | |
| INVENTOR(S) | : Jean Yves Huot | |

It is certified that error appears in the above-identified patent and that said Letters Patent is hereby corrected as shown below:

<u>Column 9,</u>
Table 3, Example C3, under "PSD… +325 mesh", change "16.7%" to -- 6.7% --.
Table 4A, Example C5, under "PSD… +635 mesh", change "10.5%" to -- $\leq$0.5% --.

Signed and Sealed this

Thirteenth Day of August, 2002

*Attest:*

JAMES E. ROGAN
*Attesting Officer*   *Director of the United States Patent and Trademark Office*